(12) United States Patent
Peterson et al.

(10) Patent No.: US 10,818,449 B2
(45) Date of Patent: Oct. 27, 2020

(54) APPARATUS AND METHOD OF BACKLIGHTING THROUGH A COVER ON THE APPARATUS

(71) Applicant: Rohinni, LLC, Coeur d'Alene, ID (US)

(72) Inventors: Cody Peterson, Hayden, ID (US); Andrew Huska, Liberty Lake, WA (US); Lars Huschke, Spokane, WA (US); Peter Bokma, Coeur D Alene, ID (US); Clinton Adams, Coeur d'Alene, ID (US)

(73) Assignee: Rohinni, LLC, Coeur d'Alene, ID (US)

( * ) Notice: Subject to any disclaimer, the term of this patent is extended or adjusted under 35 U.S.C. 154(b) by 0 days.

(21) Appl. No.: 16/836,776

(22) Filed: Mar. 31, 2020

(65) Prior Publication Data

US 2020/0227217 A1  Jul. 16, 2020

Related U.S. Application Data

(63) Continuation of application No. 16/069,871, filed as application No. PCT/US2017/013817 on Jan. 17, 2017, now Pat. No. 10,629,393.

(Continued)

(51) Int. Cl.
  *H01H 13/83* (2006.01)
  *G06F 3/02* (2006.01)

(52) U.S. Cl.
  CPC ............ *H01H 13/83* (2013.01); *G06F 3/0202* (2013.01); *H01H 2209/082* (2013.01);
  (Continued)

(58) Field of Classification Search
  CPC ............. H01H 13/83; H01H 2219/062; H01H 13/023; H01H 2219/036; H01H 2219/056;
  (Continued)

(56) References Cited

U.S. PATENT DOCUMENTS 2,344,136 A   3/1944  Dressen
3,717,743 A   2/1973  Costello
(Continued)

FOREIGN PATENT DOCUMENTS

CN   203055745 U   7/2013
EP      1628459    2/2006
(Continued)

OTHER PUBLICATIONS

Choi et al., "Flexible InGaN LEDs on a Polyimide Substrate Fabricated Using a Simple Direct-Transfer Method," IEEE Photonics Technology Letters., vol. 26, No. 21, Nov. 1, 2014, pp. 2115-2117.

(Continued)

*Primary Examiner* — Ahmed M Saeed
(74) *Attorney, Agent, or Firm* — Lee & Hayes, P.C.

(57) ABSTRACT

A keyboard apparatus includes a key cover having a plurality of holes that extend through a thickness of the cover from a top side of the cover to a bottom side of the cover. The plurality of holes are arranged to collectively form a predetermined shape. A mask layer is disposed at the bottom side of the cover. A first region of the mask layer is opaque and a second region of the mask layer allows light to pass therethrough to the plurality of holes. A light source is disposed beneath the mask layer and positioned such that light emitted from the light source passes through the second region of the mask layer to the plurality of holes. A sensory contact terminal is disposed beneath the mask layer, and the terminal detects a keystroke movement.

20 Claims, 4 Drawing Sheets

Related U.S. Application Data

(60) Provisional application No. 62/279,461, filed on Jan. 15, 2016.

(52) U.S. Cl.
CPC ... *H01H 2209/086* (2013.01); *H01H 2219/00* (2013.01); *H01H 2219/028* (2013.01); *H01H 2219/052* (2013.01); *H01H 2219/056* (2013.01); *H01H 2223/044* (2013.01); *H01H 2229/02* (2013.01)

(58) Field of Classification Search
CPC .... H01H 2221/07; H01H 9/161; H01H 9/182; H01H 19/025; H01H 23/025; H01H 13/14; H01H 3/125; H01H 13/7065; H01H 13/704; H01H 13/04; H01H 13/70; H01H 13/20; H01H 13/50; H01H 13/52; H01H 2221/036; H01H 3/12
See application file for complete search history.

(56) References Cited

U.S. PATENT DOCUMENTS

| | | |
|---|---|---|
| D235,788 S | 7/1975 | Eberhardt |
| 3,935,986 A | 2/1976 | Lattari et al. |
| 4,060,185 A | 11/1977 | Kuroda |
| 4,093,973 A | 6/1978 | Vaagenes |
| 4,997,196 A | 3/1991 | Wood |
| 5,110,752 A | 5/1992 | Lu |
| 5,131,582 A | 7/1992 | Kaplan et al. |
| D334,543 S | 4/1993 | Falcone |
| 5,266,514 A | 11/1993 | Tuan et al. |
| 5,378,926 A | 1/1995 | Chi et al. |
| 5,408,060 A | 4/1995 | Muurinen |
| 5,426,558 A | 6/1995 | Sherman |
| 5,435,857 A | 7/1995 | Han et al. |
| 5,442,254 A | 8/1995 | Jaskie |
| 5,493,470 A | 2/1996 | Zavracky et al. |
| 5,592,358 A | 1/1997 | Shamouilian et al. |
| 5,640,133 A | 6/1997 | MacDonald et al. |
| 5,740,956 A | 4/1998 | Seo et al. |
| 5,745,331 A | 4/1998 | Shamouilian et al. |
| D394,391 S | 5/1998 | Bruce et al. |
| 5,746,493 A | 5/1998 | Jonsson et al. |
| 5,771,253 A | 6/1998 | Chang-Hasnain et al. |
| 5,839,187 A | 11/1998 | Sato et al. |
| 5,851,664 A | 12/1998 | Bennett et al. |
| 5,888,847 A | 3/1999 | Rostoker et al. |
| 5,903,428 A | 5/1999 | Grimard et al. |
| 5,993,019 A | 11/1999 | Kline et al. |
| 5,996,218 A | 12/1999 | Shamouilian et al. |
| 6,071,795 A | 6/2000 | Cheung et al. |
| 6,080,650 A | 6/2000 | Edwards |
| 6,081,414 A | 6/2000 | Flanigan et al. |
| 6,130,445 A | 10/2000 | Wang et al. |
| 6,158,867 A | 12/2000 | Parker et al. |
| 6,319,778 B1 | 11/2001 | Chen et al. |
| 6,335,263 B1 | 1/2002 | Cheung et al. |
| D456,724 S | 5/2002 | Wilson |
| 6,403,985 B1 | 6/2002 | Fan et al. |
| 6,410,942 B1 | 6/2002 | Thibeault et al. |
| 6,416,196 B1 | 7/2002 | Lemarchand et al. |
| 6,420,242 B1 | 7/2002 | Cheung et al. |
| 6,427,901 B2 | 8/2002 | Dautartas |
| D463,987 S | 10/2002 | Wilson |
| 6,521,511 B1 | 2/2003 | Inoue et al. |
| D474,984 S | 5/2003 | Wilson |
| 6,558,109 B2 | 5/2003 | Gibbel |
| 6,586,875 B1 | 7/2003 | Chen et al. |
| 6,613,610 B2 | 9/2003 | Iwafuchi et al. |
| 6,629,553 B2 | 10/2003 | Odashima et al. |
| 6,664,489 B2 | 12/2003 | Kleinhans et al. |
| 6,670,038 B2 | 12/2003 | Sun et al. |
| 6,683,368 B1 | 1/2004 | Mostafazadeh |
| 6,762,069 B2 | 7/2004 | Huang et al. |
| 6,765,503 B1 | 7/2004 | Chan et al. |
| 6,786,390 B2 | 9/2004 | Yang et al. |
| 6,813,291 B2 | 11/2004 | Wang et al. |
| 6,825,105 B2 | 11/2004 | Grover et al. |
| 6,878,607 B2 | 4/2005 | Inoue et al. |
| 6,911,666 B2 | 6/2005 | Voutsas |
| 6,946,322 B2 | 9/2005 | Brewer |
| D513,997 S | 1/2006 | Wilson |
| 7,033,842 B2 | 4/2006 | Haji et al. |
| 7,148,127 B2 | 12/2006 | Oohata et al. |
| 7,160,633 B2 | 1/2007 | Tai et al. |
| 7,165,711 B2 | 1/2007 | Barretto et al. |
| 7,199,397 B2 | 4/2007 | Huang et al. |
| 7,208,337 B2 | 4/2007 | Eisert et al. |
| D543,122 S | 5/2007 | Lafever et al. |
| 7,335,527 B2 | 2/2008 | Sawyer et al. |
| 7,353,596 B2 | 4/2008 | Shida et al. |
| 7,358,158 B2 | 4/2008 | Aihara et al. |
| 7,439,549 B2 | 10/2008 | Marchl et al. |
| 7,482,059 B2 | 1/2009 | Peng et al. |
| 7,482,696 B2 | 1/2009 | Shei et al. |
| 7,510,889 B2 | 3/2009 | Pan et al. |
| 7,560,738 B2 | 7/2009 | Liu |
| 7,585,703 B2 | 9/2009 | Matsumura et al. |
| 7,628,309 B1 | 12/2009 | Eriksen et al. |
| 7,642,710 B2 | 1/2010 | Yao et al. |
| 7,669,210 B2 | 2/2010 | Izumisawa |
| 7,714,336 B2 | 5/2010 | Imai |
| 7,719,187 B2 | 5/2010 | Ray et al. |
| 7,723,764 B2 | 5/2010 | Oohata et al. |
| 7,785,481 B2 | 8/2010 | Wang |
| 7,795,629 B2 | 9/2010 | Watanabe et al. |
| 7,795,804 B2 | 9/2010 | Kim |
| 7,797,820 B2 | 9/2010 | Shida et al. |
| 7,829,366 B2 | 11/2010 | Miller et al. |
| 7,838,410 B2 | 11/2010 | Hirao et al. |
| 7,854,365 B2 | 12/2010 | Li et al. |
| 7,880,184 B2 | 2/2011 | Iwafuchi et al. |
| 7,884,543 B2 | 2/2011 | Doi |
| 7,888,690 B2 | 2/2011 | Iwafuchi et al. |
| 7,906,787 B2 | 3/2011 | Kang |
| 7,910,945 B2 | 3/2011 | Donofrio et al. |
| D636,686 S | 4/2011 | Cobbett et al. |
| 7,927,976 B2 | 4/2011 | Menard |
| 7,928,465 B2 | 4/2011 | Lee et al. |
| 7,929,195 B2 | 4/2011 | Bifano |
| D637,094 S | 5/2011 | Cobbett et al. |
| D638,327 S | 5/2011 | Cobbett et al. |
| D638,736 S | 5/2011 | Cobbett et al. |
| 7,943,497 B2 | 5/2011 | Nakai |
| 7,947,915 B2 | 5/2011 | Lee et al. |
| 7,952,043 B2 | 5/2011 | Lin |
| 7,953,134 B2 | 5/2011 | Chin et al. |
| 7,972,031 B2 | 7/2011 | Ray et al. |
| 7,972,875 B2 | 7/2011 | Rogers et al. |
| 7,989,266 B2 | 8/2011 | Borthakur et al. |
| 7,992,332 B2 | 8/2011 | Lowenthal et al. |
| 7,999,454 B2 | 8/2011 | Winters et al. |
| 8,023,248 B2 | 9/2011 | Yonekura et al. |
| 8,076,670 B2 | 12/2011 | Slater, Jr. et al. |
| 8,133,768 B2 | 3/2012 | Ray et al. |
| 8,182,303 B2 | 5/2012 | Ray et al. |
| 8,183,772 B2 | 5/2012 | Ray et al. |
| 8,186,568 B2 | 5/2012 | Coronel et al. |
| 8,264,777 B2 | 9/2012 | Skipor et al. |
| 8,294,168 B2 | 10/2012 | Park et al. |
| 8,329,485 B2 | 12/2012 | McKean |
| 8,333,860 B1 | 12/2012 | Bibl et al. |
| 8,349,116 B1 | 1/2013 | Bibl et al. |
| 8,381,965 B2 | 2/2013 | Jang et al. |
| 8,383,506 B1 | 2/2013 | Golda et al. |
| 8,384,630 B2 | 2/2013 | Ray et al. |
| 8,395,312 B2 | 3/2013 | Hum |
| 8,395,568 B2 | 3/2013 | Ray et al. |
| 8,415,767 B1 | 4/2013 | Golda et al. |
| 8,415,768 B1 | 4/2013 | Golda et al. |
| 8,415,771 B1 | 4/2013 | Golda et al. |
| 8,415,879 B2 | 4/2013 | Lowenthal et al. |

(56) References Cited

U.S. PATENT DOCUMENTS

| | | |
|---|---|---|
| 8,426,227 B1 | 4/2013 | Bibl et al. |
| 8,454,859 B2 | 6/2013 | Lowenthal et al. |
| 8,456,392 B2 | 6/2013 | Ray et al. |
| 8,456,393 B2 | 6/2013 | Ray et al. |
| D687,736 S | 8/2013 | Wycoff |
| 8,506,867 B2 | 8/2013 | Menard |
| D688,968 S | 9/2013 | Guerrero, II |
| 8,552,436 B2 | 10/2013 | Bibl et al. |
| 8,558,243 B2 | 10/2013 | Bibl et al. |
| 8,569,115 B1 | 10/2013 | Golda et al. |
| 8,573,469 B2 | 11/2013 | Hu et al. |
| 8,646,505 B2 | 2/2014 | Bibl et al. |
| 8,664,699 B2 | 3/2014 | Nuzzo et al. |
| 8,674,593 B2 | 3/2014 | Lowenthal et al. |
| 8,686,542 B2 | 4/2014 | Golda et al. |
| 8,716,767 B2 | 5/2014 | Golda et al. |
| 8,739,440 B2 | 6/2014 | Lowenthal et al. |
| 8,739,441 B2 | 6/2014 | Lowenthal et al. |
| 8,753,946 B2 | 6/2014 | Ray et al. |
| 8,753,947 B2 | 6/2014 | Ray et al. |
| 8,772,814 B2 | 7/2014 | Ray et al. |
| 8,789,573 B2 | 7/2014 | Bibl et al. |
| 8,791,474 B1 | 7/2014 | Bibl et al. |
| 8,791,530 B2 | 7/2014 | Bibl et al. |
| 8,794,501 B2 | 8/2014 | Bibl et al. |
| 8,809,126 B2 | 8/2014 | Lowenthal et al. |
| 8,809,875 B2 | 8/2014 | Bibl et al. |
| 8,835,940 B2 | 9/2014 | Hu et al. |
| 8,846,457 B2 | 9/2014 | Lowenthal et al. |
| 8,852,467 B2 | 10/2014 | Lowenthal et al. |
| 8,853,939 B2 | 10/2014 | Ray et al. |
| 8,877,101 B2 | 11/2014 | Lowenthal et al. |
| 8,877,648 B2 | 11/2014 | Bower et al. |
| 8,889,216 B2 | 11/2014 | Ray et al. |
| 8,889,485 B2 | 11/2014 | Bower |
| 8,906,713 B2 | 12/2014 | Rettke |
| 8,921,437 B2 | 12/2014 | Knott et al. |
| 8,933,433 B2 | 1/2015 | Higginson et al. |
| 8,934,259 B2 | 1/2015 | Bower et al. |
| 8,940,627 B2 | 1/2015 | Blanchard et al. |
| 8,941,215 B2 | 1/2015 | Hu et al. |
| 8,945,968 B2 | 2/2015 | Bibl et al. |
| 8,963,168 B1 | 2/2015 | Rettke |
| 8,982,446 B2 | 3/2015 | Ray |
| 8,987,765 B2 | 3/2015 | Bibl et al. |
| 8,999,742 B1 | 4/2015 | Lowenthal et al. |
| 9,000,566 B2 | 4/2015 | Golda et al. |
| 9,012,945 B2 | 4/2015 | Ray |
| 9,018,833 B2 | 4/2015 | Lowenthal et al. |
| 9,034,754 B2 | 5/2015 | Golda et al. |
| 9,035,174 B2 | 5/2015 | Youngbull et al. |
| 9,035,279 B2 | 5/2015 | Hu et al. |
| 9,044,926 B2 | 6/2015 | Golda et al. |
| 9,047,818 B1 | 6/2015 | Day et al. |
| 9,048,031 B2 | 6/2015 | Ray et al. |
| 9,074,758 B2 | 7/2015 | Oraw et al. |
| 9,083,010 B2 | 7/2015 | Lockett et al. |
| 9,099,568 B2 | 8/2015 | Blanchard |
| 9,105,492 B2 | 8/2015 | Bibl et al. |
| 9,105,714 B2 | 8/2015 | Hu et al. |
| 9,105,812 B2 | 8/2015 | Lowenthal et al. |
| 9,119,244 B2 | 8/2015 | Lowenthal et al. |
| D738,748 S | 9/2015 | Bibl et al. |
| D738,749 S | 9/2015 | Bibl et al. |
| 9,130,124 B2 | 9/2015 | Lowenthal et al. |
| 9,136,065 B2 | 9/2015 | Lockett et al. |
| 9,136,161 B2 | 9/2015 | Bibl et al. |
| 9,142,535 B2 | 9/2015 | Oraw |
| 9,153,548 B2 | 10/2015 | Chan et al. |
| 9,153,732 B2 | 10/2015 | Oraw |
| 9,177,992 B2 | 11/2015 | Blanchard et al. |
| 9,196,606 B2 | 11/2015 | Oraw |
| 9,200,758 B2 | 12/2015 | Lowenthal et al. |
| 9,209,348 B2 | 12/2015 | Hu et al. |
| 9,217,541 B2 | 12/2015 | Bathurst et al. |
| 9,224,629 B2 | 12/2015 | Golda et al. |
| 9,236,527 B2 | 1/2016 | Ray et al. |
| 9,236,528 B2 | 1/2016 | Ray et al. |
| 9,236,815 B2 | 1/2016 | Golda et al. |
| 9,240,397 B2 | 1/2016 | Bibl et al. |
| 9,255,001 B2 | 2/2016 | Golda et al. |
| 2001/0029088 A1 | 10/2001 | Odajima et al. |
| 2002/0022308 A1 | 2/2002 | Ahn et al. |
| 2002/0036471 A1 | 3/2002 | Silvestre |
| 2002/0056740 A1 | 5/2002 | Hayashi |
| 2002/0076848 A1 | 6/2002 | Spooner et al. |
| 2002/0171518 A1 | 11/2002 | Hsu et al. |
| 2002/0196618 A1 | 12/2002 | Douzono et al. |
| 2003/0010975 A1 | 1/2003 | Gibb et al. |
| 2003/0017360 A1 | 1/2003 | Tai et al. |
| 2003/0040142 A1 | 2/2003 | Lin et al. |
| 2003/0151908 A1 | 8/2003 | Fried |
| 2003/0169786 A1 | 9/2003 | Kapon et al. |
| 2004/0110027 A1 | 6/2004 | Chen et al. |
| 2004/0124490 A1 | 7/2004 | Bohr et al. |
| 2004/0161943 A1 | 8/2004 | Ren et al. |
| 2004/0227704 A1 | 11/2004 | Wang et al. |
| 2004/0232439 A1 | 11/2004 | Gibb et al. |
| 2004/0266048 A1 | 12/2004 | Platt et al. |
| 2005/0051782 A1 | 3/2005 | Negley et al. |
| 2005/0104530 A1 | 5/2005 | Chung et al. |
| 2005/0210988 A1 | 9/2005 | Amano et al. |
| 2005/0232728 A1 | 10/2005 | Rice et al. |
| 2005/0274959 A1 | 12/2005 | Kim et al. |
| 2006/0037848 A1 | 2/2006 | Kobayashi |
| 2006/0055035 A1 | 3/2006 | Lin et al. |
| 2006/0154390 A1 | 7/2006 | Tran et al. |
| 2006/0157721 A1 | 7/2006 | Tran et al. |
| 2006/0160276 A1 | 7/2006 | Brown et al. |
| 2006/0169993 A1 | 8/2006 | Fan et al. |
| 2006/0202210 A1 | 9/2006 | Mok et al. |
| 2006/0208271 A1 | 9/2006 | Kim et al. |
| 2006/0214299 A1 | 9/2006 | Fairchild et al. |
| 2006/0238463 A1 | 10/2006 | Kim et al. |
| 2007/0014920 A1 | 1/2007 | Syms |
| 2007/0048902 A1 | 3/2007 | Hiatt et al. |
| 2007/0115263 A1 | 5/2007 | Taylor et al. |
| 2007/0152965 A1 | 7/2007 | Krzyzanowski et al. |
| 2007/0166851 A1 | 7/2007 | Tran et al. |
| 2007/0194330 A1 | 8/2007 | Ibbetson et al. |
| 2007/0235306 A1 | 10/2007 | Chiba et al. |
| 2008/0001787 A1 | 1/2008 | Smith et al. |
| 2008/0048206 A1 | 2/2008 | Lee et al. |
| 2008/0048520 A1 | 2/2008 | Gulvin et al. |
| 2008/0194054 A1 | 8/2008 | Lin et al. |
| 2008/0196237 A1 | 8/2008 | Shinya et al. |
| 2008/0303038 A1 | 12/2008 | Grotsch et al. |
| 2008/0315236 A1 | 12/2008 | Lu et al. |
| 2009/0014749 A1 | 1/2009 | Matsuda |
| 2009/0068774 A1 | 3/2009 | Slater, Jr. et al. |
| 2009/0072382 A1 | 3/2009 | Guzek |
| 2009/0140282 A1 | 6/2009 | Wu et al. |
| 2009/0146303 A1 | 6/2009 | Kwon |
| 2009/0173610 A1 | 7/2009 | Bronstein et al. |
| 2009/0224947 A1 | 9/2009 | Frazier |
| 2009/0231857 A1 | 9/2009 | Ito et al. |
| 2009/0284501 A1 | 11/2009 | Nathan et al. |
| 2009/0301176 A1 | 12/2009 | Rowe et al. |
| 2009/0303713 A1 | 12/2009 | Chang et al. |
| 2009/0314991 A1 | 12/2009 | Cho et al. |
| 2010/0039747 A1 | 2/2010 | Sansoni et al. |
| 2010/0046134 A1 | 2/2010 | Mizuno et al. |
| 2010/0051910 A1 | 3/2010 | Choi |
| 2010/0097246 A1 | 4/2010 | Watanabe et al. |
| 2010/0097738 A1 | 4/2010 | Kang et al. |
| 2010/0123164 A1 | 5/2010 | Suehiro et al. |
| 2010/0142114 A1 | 6/2010 | Purohit et al. |
| 2010/0149720 A1 | 6/2010 | Fujisawa et al. |
| 2010/0178139 A1 | 7/2010 | Sundar et al. |
| 2010/0188794 A1 | 7/2010 | Park et al. |
| 2010/0200884 A1 | 8/2010 | Lee et al. |
| 2010/0203659 A1 | 8/2010 | Akaike et al. |
| 2010/0203661 A1 | 8/2010 | Hodota |
| 2010/0213471 A1 | 8/2010 | Fukasawa et al. |

(56) References Cited

U.S. PATENT DOCUMENTS

| | | |
|---|---|---|
| 2010/0214777 A1 | 8/2010 | Suehiro et al. |
| 2010/0238120 A1 | 9/2010 | Hsieh |
| 2010/0244077 A1 | 9/2010 | Yao |
| 2010/0276726 A1 | 11/2010 | Cho et al. |
| 2010/0288607 A1 | 11/2010 | Ozias et al. |
| 2010/0302169 A1 | 12/2010 | Pance et al. |
| 2010/0309100 A1 | 12/2010 | Cok et al. |
| 2011/0003410 A1 | 1/2011 | Tsay et al. |
| 2011/0049540 A1 | 3/2011 | Wang et al. |
| 2011/0057866 A1 | 3/2011 | Konicek |
| 2011/0089464 A1 | 4/2011 | Lin et al. |
| 2011/0121462 A1 | 5/2011 | Kim |
| 2011/0132655 A1 | 6/2011 | Horiguchi et al. |
| 2011/0132656 A1 | 6/2011 | Horiguchi et al. |
| 2011/0136324 A1 | 6/2011 | Ashdown et al. |
| 2011/0143467 A1 | 6/2011 | Xiong et al. |
| 2011/0151602 A1 | 6/2011 | Speier |
| 2011/0159615 A1 | 6/2011 | Lai |
| 2011/0165707 A1 | 7/2011 | Lott et al. |
| 2011/0198598 A1 | 8/2011 | Kim et al. |
| 2011/0210357 A1 | 9/2011 | Kaiser et al. |
| 2011/0247925 A1 | 10/2011 | Lin |
| 2011/0249423 A1 | 10/2011 | Ho et al. |
| 2011/0284867 A1 | 11/2011 | Tran et al. |
| 2011/0291134 A1 | 12/2011 | Kang |
| 2011/0291572 A1 | 12/2011 | Burroughes et al. |
| 2011/0297914 A1 | 12/2011 | Zheng et al. |
| 2011/0309382 A1 | 12/2011 | Lowgren |
| 2011/0312131 A1 | 12/2011 | Renavikar et al. |
| 2012/0012448 A1 | 1/2012 | Pance et al. |
| 2012/0013490 A1 | 1/2012 | Pance |
| 2012/0027557 A1 | 2/2012 | Ashdown et al. |
| 2012/0032573 A1 | 2/2012 | Lai |
| 2012/0048700 A1 | 3/2012 | Liu |
| 2012/0048702 A1 | 3/2012 | Liu |
| 2012/0064642 A1 | 3/2012 | Huang et al. |
| 2012/0134065 A1 | 5/2012 | Furuya et al. |
| 2012/0146030 A1 | 6/2012 | You et al. |
| 2012/0161113 A1 | 6/2012 | Lowenthal et al. |
| 2012/0164796 A1 | 6/2012 | Lowenthal et al. |
| 2012/0168714 A1 | 7/2012 | Chu et al. |
| 2012/0199455 A1 | 8/2012 | Niu et al. |
| 2012/0223875 A1 | 9/2012 | Lau et al. |
| 2012/0234043 A1 | 9/2012 | Guerrero, II |
| 2012/0248477 A1 | 10/2012 | Tischler et al. |
| 2012/0286208 A1 | 11/2012 | McKean et al. |
| 2012/0326188 A1 | 12/2012 | Han |
| 2013/0015985 A1 | 1/2013 | Peterson et al. |
| 2013/0019996 A1 | 1/2013 | Routledge |
| 2013/0038416 A1 | 2/2013 | Arai et al. |
| 2013/0044215 A1 | 2/2013 | Rothkopf et al. |
| 2013/0121017 A1 | 5/2013 | Tsai |
| 2013/0134591 A1 | 5/2013 | Sakamoto et al. |
| 2013/0161682 A1 | 6/2013 | Liang et al. |
| 2013/0187179 A1 | 7/2013 | Tan et al. |
| 2013/0210194 A1 | 8/2013 | Bibl et al. |
| 2013/0285086 A1 | 10/2013 | Hu et al. |
| 2013/0343053 A1 | 12/2013 | Holman et al. |
| 2014/0035960 A1 | 2/2014 | You et al. |
| 2014/0061687 A1 | 3/2014 | Hu et al. |
| 2014/0104243 A1 | 4/2014 | Sakariya et al. |
| 2014/0132154 A1 | 5/2014 | Fried |
| 2014/0159064 A1 | 6/2014 | Sakariya et al. |
| 2014/0159065 A1 | 6/2014 | Hu et al. |
| 2014/0159067 A1 | 6/2014 | Sakariya et al. |
| 2014/0166456 A1 | 6/2014 | Chen |
| 2014/0168037 A1 | 6/2014 | Sakariya et al. |
| 2014/0169927 A1 | 6/2014 | Golda et al. |
| 2014/0241844 A1 | 8/2014 | Golda et al. |
| 2015/0022995 A1 | 1/2015 | Peterson et al. |
| 2015/0083561 A1 | 3/2015 | Han et al. |
| 2015/0136573 A1 | 5/2015 | Peterson et al. |
| 2015/0138096 A1 | 5/2015 | Peterson et al. |
| 2015/0234108 A1 | 8/2015 | Harley, Jr. |
| 2016/0055988 A1 | 2/2016 | Muller |
| 2016/0093452 A1 | 3/2016 | Zercoe et al. |
| 2016/0329173 A1 | 11/2016 | Petterson et al. |
| 2017/0060190 A1 | 3/2017 | Hegde et al. |
| 2019/0051473 A1 | 2/2019 | Peterson et al. |

FOREIGN PATENT DOCUMENTS

| | | |
|---|---|---|
| EP | 1780798 | 5/2007 |
| EP | 2043120 | 4/2009 |
| JP | H11194874 A | 7/1999 |
| JP | 2004213924 | 7/2004 |
| JP | 2006060334 | 3/2006 |
| JP | 2007280810 | 10/2007 |
| JP | 2010511239 | 4/2010 |
| JP | 3171486 | 10/2011 |
| JP | 2012216164 | 11/2012 |
| JP | 2013504861 | 2/2013 |
| WO | WO0067543 | 11/2000 |
| WO | WO03012884 | 2/2003 |
| WO | WO2004032247 | 4/2004 |
| WO | WO2005099310 | 10/2005 |
| WO | WO2008143635 | 11/2008 |
| WO | WO2011072372 | 6/2011 |
| WO | WO2011102030 | 8/2011 |
| WO | WO2011123285 | 10/2011 |
| WO | WO2012044262 | 4/2012 |
| WO | WO2013074357 | 5/2013 |
| WO | WO2013074370 | 5/2013 |
| WO | WO2014130353 | 8/2014 |
| WO | WO2014149864 | 9/2014 |
| WO | WO2014204694 | 12/2014 |
| WO | WO2014204695 | 12/2014 |
| WO | WO2015006000 | 1/2015 |
| WO | WO2015094600 | 6/2015 |
| WO | WO2015094601 | 6/2015 |
| WO | WO2015099944 | 7/2015 |
| WO | WO2015176044 A1 | 11/2015 |

OTHER PUBLICATIONS

Chinese Office Action dated Jan. 18, 2018 for Chinese Patent Application No. 201480043264.3, a counterpart foreign application of U.S. Appl. No. 14/390,393.

Chinese Office Action dated Apr. 29, 2019 for Chinese Patent Application No. 201480043264.3, a counterpart of U.S. Appl. No. 14/390,393, 3 pages.

Chinese Office Action dated Sep. 30, 2018, for Chinese Patent Application No. 201480043264.3, a counterpart foreign patent application of U.S. Appl. No. 14/390,393, 4 pages.

Coleglove, "Flexible LED Lighting at 2013 FlexTech," retrieved on Apr. 4, 2019 at «https//touchdisplayreserch.com/? Touch Display Research Inc, Feb. 5, 2013, 2 pages.

European Office Action dated Apr. 29, 2020 for European Patent Application No. 14811725.2, a counterpart foreign application of the U.S. Appl. No. 14/390,393, 4 pages.

European Office Action dated Jun. 5, 2020, for European Patent Application No. 17739164.6, a counterpart foreign application of the U.S. Pat. No. 10,629,393, 6 pages.

European Office Action dated Oct. 18, 2018 for European Patetn Application No. 14811725.2, a counterpart foreign application of the U.S. Appl. No. 14/390,393, 7 pages.

Extended European Search Report dated Feb. 11, 2019 for European Patent Application No. 17739164.6, 10 pages.

Extended European Search Report dated Mar. 1, 2017 for European Patent Application No. 14811725.2, 8 pages.

"Innovate Keypad Design With Light Guides and LEDs," Nov. 17, 2009, Avago Technologies, pp. 1-14.

Japanese Office Action dated Nov. 13, 2018 for Japanese patent application No. 2016-519634, a counterpart foreign application of U.S. Appl. No. 14/390,393, 7 pages.

Japanese Office Action dated Mar. 27, 2018 for Japanese patent application No. 2016-519634, a counterpart foreign application of U.S. Appl. No. 14/390,393, 6 pages.

Japanese Reconsideration Report mailed on Apr. 23, 2019 for Japanese Patent Application No. 2016-519634, a counterpart of U.S. Appl. No. 14/390,393, 5 pages.

(56) References Cited

OTHER PUBLICATIONS

"Keyboard Backlight Uses Less Power, Fewer LEDs," retrieved on Jun. 14, 2013 at «www.designworldonlin.com/keyboard-backlight-uses-less-power-fewer-leds/#_», Design World, Jun. 9, 2008, pp. 1-3.

NthDegree, "In the Media," retrieved on Apr. 4, 2019 at «https://www.ndeg.com/about», NthDegree Technologies Inc., 3 pages.

Final Office Action dated Feb. 11, 2019 for U.S. Appl. No. 14/507,713 "Keyboard Backlighting With Deposited Light-Generating Sources," Peterson, 28 pages.

Non Final Office Action dated Mar. 21, 2019 for U.S. Appl. No. 16/069,871 "Apparatus and Method of Backlighting Through a Cover on the Apparatus," Peterson, 10 pages.

Office action for U.S. Appl. No. 14/507,729, dated Jan. 11, 2017, Peterson et al., "Keyboard Backlighting with Deposited Light-Generating Sources," 30 pages.

Office action for U.S. Appl. No. 14/390,393, dated Jan. 18, 2017, Peterson et al., "Keyboard Backlighting With Deposited Light-Generating Sources," 9 pages.

Office action for U.S. Appl. No. 14/390,393, dated Oct. 12, 2016, Peterson et al., "Keyboard Backlighting With Deposited Light-Generating Sources," 9 pages.

Office action for U.S. Appl. No. 14/507,308, dated Oct. 3, 2016, Peterson et al., "Keyboard Backlighting With Deposited Light-Generating Sources," 22 pages.

Office Action for U.S. Appl. No. 14/507,713, dated Nov. 30, 2015, Peterson et al, pp. 1-10.

Office action for U.S. Appl. No. 14/507,308, dated Feb. 7, 2017, Peterson et al., "Keyboard Backlighting With Deposited Light-Generating Sources," 30 pages.

Office action for U.S. Appl. No. 14/507,729, dated Mar. 11, 2016, Peterson et al., "Keyboard Backlighting with Deposited Light-Generating Sources," 18 pages.

Office action for U.S. Appl. No. 14/507,729, dated Jul. 29, 2016, Peterson et al., "Keyboard Backlighting Deposited Light-Generating Sources," 19 pages.

Office Action for U.S. Appl. No. 16/069,871, dated Aug. 23, 2019, Peterson, "Apparatus and Method of Backlighting Through a Cover on the Apparatus," 8 pages.

Office action for U.S. Appl. No. 14/507,713, dated Sep. 16, 2016, Peterson et al., "Keyboard Backlighting With Deposited Light-Generating Sources," 16 pages.

Office Action for U.S. Appl. No. 14/507,713, dated Sep. 6, 2018, Peterson et al, "Keyboard Backlighting With Deposited Light-Generating Sources," 32 pages.

PCT Search Report and Written Opinion dated Jun. 29, 2017 for PCT Application No. PCT/US17/13817, 7 pages.

Japanese Office Action dated Aug. 4, 2020 for Japanese Patent Application No. 2019-003503, a counterpart foreign application of the U.S. Appl. No. 14/390,393, 14 pages.

APPARATUS AND METHOD OF BACKLIGHTING THROUGH A COVER ON THE APPARATUS

CROSS REFERENCE TO RELATED PATENT APPLICATIONS

This application is a continuation of and claims priority to U.S. patent application Ser. No. 16/069,871, filed on Jul. 12, 2018, the disclosure of which is a national stage application of an international patent application PCT/US17/13817, filed Jan. 17, 2017, which application claims priority to U.S. Provisional Patent Application No. 62/279,461, filed on Jan. 15, 2016, which applications are hereby incorporated by reference. Furthermore, this application incorporates U.S. patent application Ser. No. 14/939,896, filed on Nov. 12, 2015, entitled "Apparatus for Transfer of Semiconductor Devices," now patented as U.S. Pat. No. 9,633,883, in its entirety by reference.

BACKGROUND

Technical Field

The following description relates to backlighting a device and particularly to backlighting keys of a keyboard having a fabric-based cover. Further, the principles herein may be applied to other devices having covers that are fabric or non-fabric based.

Background

Devices such as keyboards may have a fabric-based cover or a non-fabric based cover. Fabrics (e.g., natural fiber fabric such as cotton, wool, etc. or synthetic fiber fabric such as polyester, acrylic, rayon, carbon fiber, etc.) are widely used in covering many items. However, due to the material structure of many fabrics, backlighting a device having a fabric cover may be challenging to produce effect or desired results. Not surprisingly, similar challenges exist with other non-fabric materials as well.

With respect to the light sources used in backlighting devices, LEDs have been used. The LEDs currently implemented for backlighting are "packaged" LEDs. The "packaged" modifier refers to the enclosure and protective features built into the final LED as well as the interface that enables the LED in the package to be incorporated into an ultimate circuit. Notably, the conventional fabrication process for LEDs, or other semiconductor devices, starts with handling a semiconductor wafer. The wafer is diced into a multitude of "unpackaged" semiconductor devices. The "unpackaged" modifier refers to an unenclosed semiconductor device without protective features. The "packaging" of an LED makes the LED substantially thicker than an unpackaged LED.

The unpackaged LEDs may be extremely small. Indeed, the height of the LEDs may range from 12.5 to 200 microns, or from 25 to 100 microns, or from 50 to 80 microns.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed generally to backlit illumination of an image, symbol, character, or other design in a surface cover of an apparatus. In many instances, the features of this disclosure are described with respect to illumination of a legend (e.g., an image, symbol, character, or other design) on a key(s) of a keyboard, where the cover of the key(s) may be a fabric or a non-fabric material. In general, backlighting may be achieved via one or more unpackaged, micro-sized LEDs disposed behind the legend from a first-person perspective view, which means that the legend (e.g., symbol, character, design, etc.) is illuminated from a light source located behind the legend such that the light of the light source diffuses through the legend in a direction toward the individual looking at the legend. For example, the light sources for lighting the keys on a keyboard are behind the cover of the keys from the perspective of an individual looking at the legend on the key(s) of the keyboard. Moreover, in an instance where the backlit apparatus is not a keyboard, the light source is similarly hidden from the direct view of the individual looking at the apparatus.

As indicated above, other implementations of the features described herein are contemplated. For example, the features described herein may be implemented in the illumination of legends on the cover of other apparatuses including apparel, displays, banners, flags, décor, signs, toys, keypads, electronics, etc. Furthermore, the concepts and designs of the features described herein as they relate to illumination of keys of a keyboard having a fabric-based cover may, in many instances, be similarly applied to the illumination of non-fabric-based materials.

Illustrative Embodiments of Illumination Through a Fabric or Non-Fabric Cover

Figure 1:
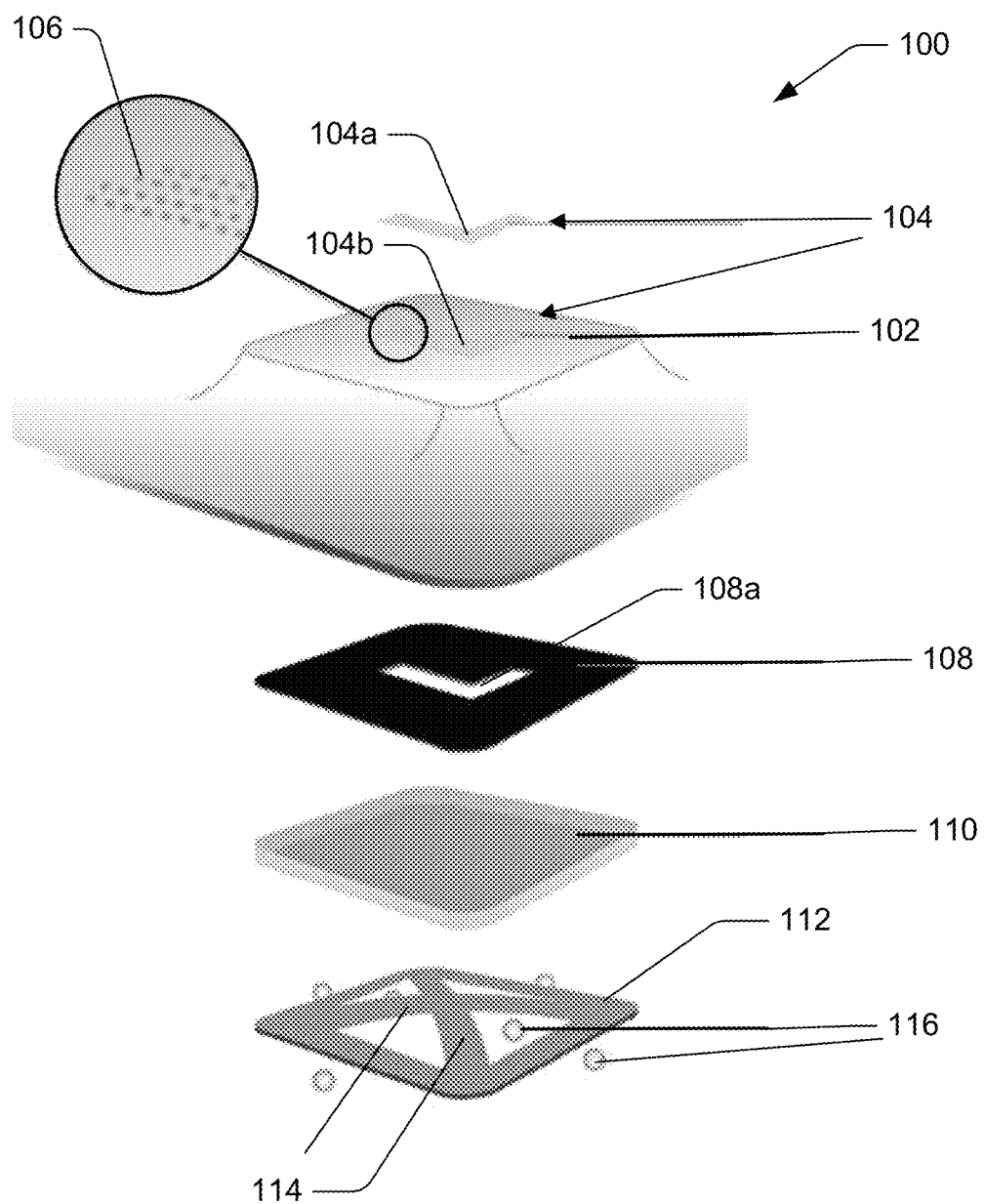
FIG. 1 illustrates an exploded perspective view of a keyboard key assembly according to an embodiment of the instant application.

FIG. 1 depicts an exploded view of at least some of the elements of an apparatus to illuminate a portion of a fabric material. More specifically, an apparatus 100, such as a key on a keyboard, for example, may include a cover 102 (e.g., keycap) having a legend 104. The cover 102 may be entirely formed of, or may at least partially include, a fabric material such as a polymer-based fabric. In some instances, the fabric material of the cover 102 may be a natural fiber, synthetic fiber, or blended type of material, such as a cotton, silk, or wool-based fabric, any of which may be used alone or blended with a polyester, acrylic, rayon, etc. or other material capable of a durable fabric-type of manufacture. Furthermore, while FIG. 1 depicts the cover 102 having a substantially planar appearance with squared edges and rounded corners, the apparatus 100 is not limited to the configuration depicted and may be formed into a variety of shapes and dimensions for a desired purpose. For example, the cover 102 may take on shapes that are rippled, rounded, spherical, triangular, cylindrical, or otherwise curved and/or pointed.

The legend 104 may be indicative of a character or grouping of characters including individual letters, numbers, and/or whole words, phrases, or sequences of numbers. In some instances, the legend 104 may indicate a form of punctuation, a symbol including emoticons and/or cultural/universal symbols, an image, a design, a shape, or other graphic to indicate a function or convey a particular meaning. As an example, the legend 104 in FIG. 1 depicts a letter "L."

Moreover, the legend 104 of cover 102 may be formed in a multitude of ways. In some instances, the legend 104 may be created via an additive type of process where an element is added to the cover 102, via a removal process where material is removed from the cover 102, or a combination of material removal and an additive process. Alternatively, the legend 104 may be formed via a molding process where the cover 102 is molded to include a legend 104 within the molded cover 102. Regardless of the method used, the end result is that the cover 102 includes a first region that is a relatively opaque portion and a second region that is a relatively translucent portion. In some instances, the translucent second region includes the legend 104 so that the legend 104 is illuminated in the midst of the opaque first region. Alternatively, one may desire to have the legend 104 display as opaque in the first region and illuminate the cover 102 around the legend 104 in the second region.

Example embodiments of additive processes for creating the legend 104 include adding a separate layer 104a that is a layer of paint, a sticker, an ink graphic applied via a printing process, a coating of either a translucent or opaque substance, an adhesive, a film, an embedded element, etc. Printing processes that may be used include inkjet, laser, dye sublimation, etc. Despite the depiction in FIG. 1 of the legend 104a on the top side of the cover 102, the above additive type processes may be used, as suitable, to create the legend 104a on the underside of the cover as well. Furthermore, while legend 104a is depicted as the desired legend shape, the layer 104a may be added as the complementary negative of the desired legend shape.

To create the legend 104 via a removal process, material of the cover 102 is removed to allow light to emit directly or diffuse more clearly through a predetermined portion the cover 102. For example, small amounts of material may be removed by creating a plurality of micro-sized holes 106 through the cover 102. The holes 106 may be closely spaced and arranged within a predetermined perimeter such that, collectively, the arrangement of the plurality of holes 106 corresponds in shape to the shape of a desired legend 104b to be illuminated. For example, the holes 106 in FIG. 1 are arranged within a perimeter designating the predetermined shape of the letter "L" to form the legend 104b. Similarly, material may be removed by creating a plurality of cavities in either the top or bottom surface of the apparatus, which cavities are not cut completely through the cover 102. Additionally, a top or bottom surface of the cover 102 may be etched such that at least a portion of the thickness of the cover 102 is removed to form a shape of the desired legend 104b. Thus, in the case of material removal, a portion of the cover 102 is thinned or cut out entirely to enhance the transmission of light therethrough. Moreover, an entirety of the predetermined shape of the desired legend may be cut out of the cover 102.

In some instances, methods of material removal include punching, cutting, and/or the use of a laser. For example, holes 106 may be formed via a laser to extend through the cover 102 from a top side of the cover 102 to a bottom side of the cover 102. The holes 106 may range in diameter from 0.1 mm to 0.2 mm, for example, or may be even smaller or larger.

As indicated above, the legend 104 may be created via a combination of material removal and an additive process. Thus, in instances where material is removed from the cover 102, the space from which material was removed may be filled, covered, or coated by an added material that helps to diffuse and enhance the backlighting as it illuminates the portion of the cover from which material was removed.

With further respect to the illumination of legend 104, as illustrated in FIG. 1, apparatus 100 may include a stenciled mask layer 108 in addition to, or in place of, legend 104a and/or legend 104b. The mask layer 108 may include a dark-colored/light-blocking substrate (e.g., a thin film, etc.), in which a portion of the substrate is removed, thereby creating an aperture 108a in the substrate. The aperture 108a may correspond directly in shape and dimensions with the perimeter of the shape of the legend 104 in the cover 102, or the shape and dimensions of aperture 108a may be larger or smaller than the perimeter of the shape of the legend 104 to increase or decrease the amount of illumination. The mask layer 108 may be adhered or otherwise placed on the underside of the cover 102.

As depicted, apparatus 100 may further include a keycap stiffener 110. The stiffener 110 may be formed of a clear material, or alternatively, of a tinted or colored material, while maintaining translucent properties. In addition to providing stability and protection of sensitive components, the stiffener 110 may further function as a light diffusion element. That is, the stiffener 110 may be textured, colored, formed, or shaped in a manner that enhances light diffusion. Furthermore, the stiffener 110 may include phosphor and/or other elements that modify the light before it passes to the legend 104. Additionally, the stiffener 110 may have a translucent center portion and opaque or not fully translucent side edges. In some instances, the stiffener 110 may be formed with two different colored materials, where the center portion is lighter than the edge portion, e.g., a white plastic planar center molded to a black plastic ring or perimeter. In other instances, the stiffener 110 may be formed from a single, translucent material, e.g., white plastic, and have the side edges thereof coated, painted, colored, or otherwise masked with a darker substance. Such embodiments of the stiffener 110 may provide some light-blocking properties, which may assist in preventing leakage of the light from undesirable areas of the apparatus.

Apparatus 100 may further include a dome 112, which is an electrically-connected, reflexive sensory contact terminal that connects with a circuit element (not shown) when force is applied to the cover 102 of apparatus 100. The dome 112 itself may include one or more flexible cross support members 114 that extend across the terminal from one side to the other forming a generally dome shaped profile. Note, for convenience, in this application, the dome 112 may be referred to herein as the "terminal" as well. Under the applied force, the cross support members 114 of the dome 112 flex elastically to make contact with the circuit element and a signal is relayed to output the intended function of the legend 104. Thus, in the example embodiment of FIG. 1, applied force on the cover 102 would relay a signal to a connected computing device to output the letter "L." Additional details regarding the functionality associated with a keyboard or other electronic circuitry are not provided herein.

Figure 3:
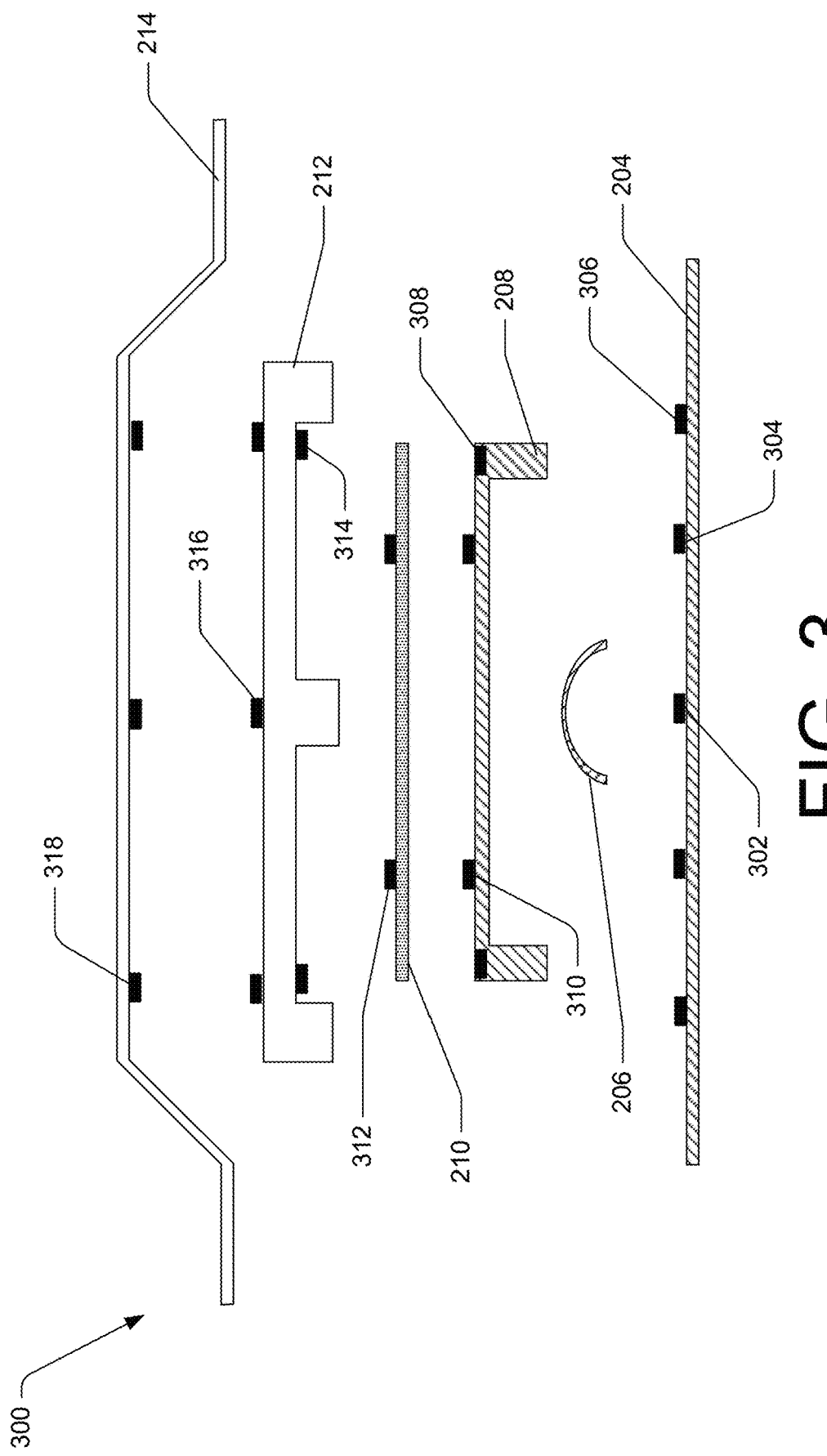
FIG. 3 illustrates an exploded cross-sectional view of a keyboard key assembly according to another embodiment of the instant application.

Illumination of the legend 104 is achieved via selective placement of one or more light sources 116. As shown in FIG. 1, light sources 116 may be placed within a perimeter or outside of the perimeter of the dome 112. The light sources 116 may include unpackaged LEDs powered via direct or indirect attachment to one or more circuit elements provided in the apparatus 100. The unpackaged LEDs may be placed by any suitable means, including via direct transfer according to the method and apparatus described in U.S. application Ser. No. 14/939,896. Additional details regarding position of placement of the light sources 116 are discussed further herein below with respect to FIG. 3.

Figure 2:
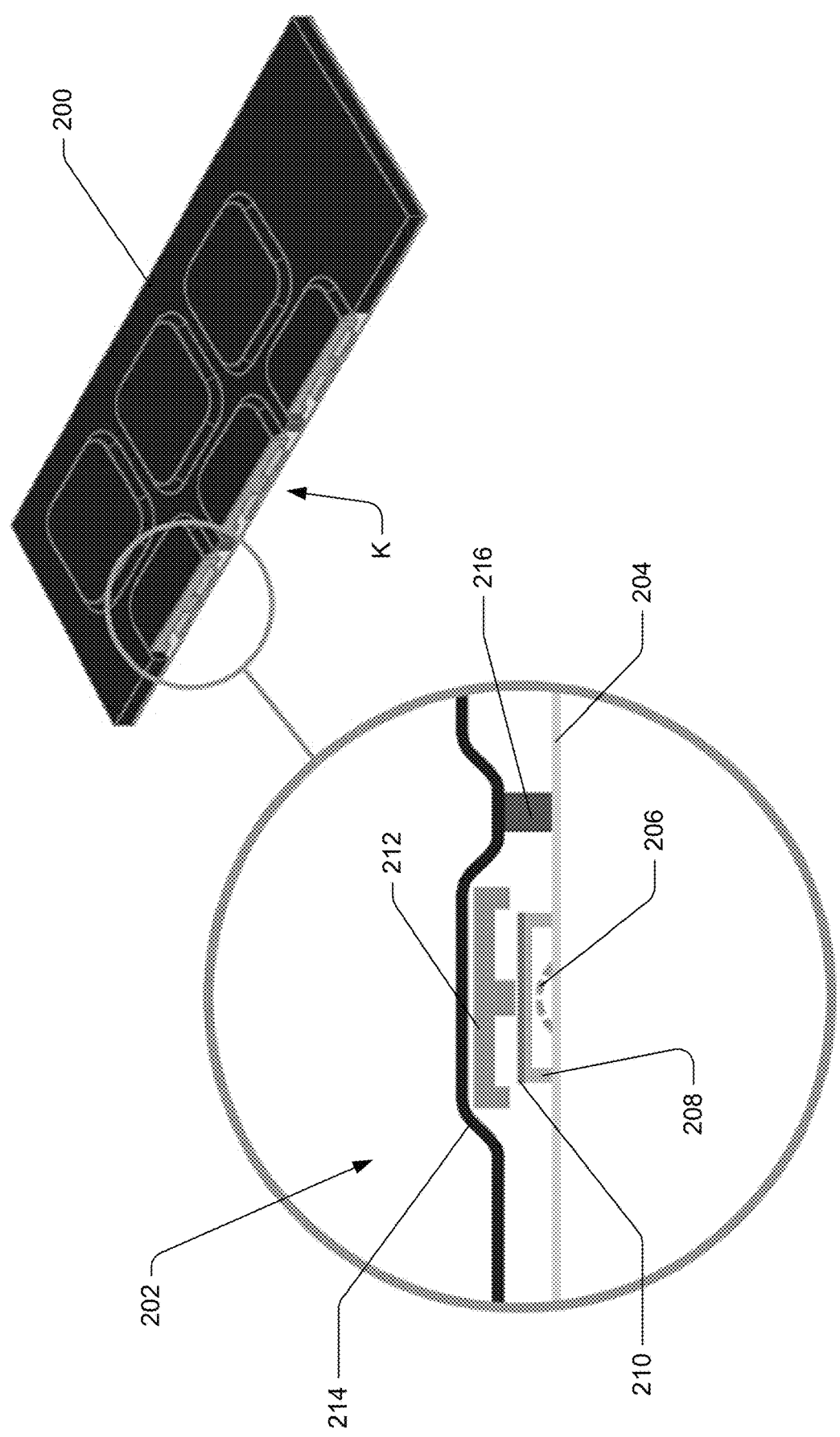
FIG. 2 illustrates a cross-sectional view of a keyboard key assembly according to another embodiment of the instant application.

In FIG. 2, a perspective view of a cross-section of a backlit keyboard 200 is depicted. Further, emphasis of a cross-sectional side view of a single key 202 of the keyboard 200 is provided. Specific elements of the structure of the key 202 include a base 204 that may include electronic circuitry elements (not shown) to interact and power aspects of the keyboard 200. Thus, the base 204 may serve as a foundation to support the structure of the key 202 thereon. The key 202 may further include a dome 206, a dome cage 208, a dome cover sheet 210, a key stiffener 212, and a cover 214.

The dome 206 functions as the sensory contact terminal, like terminal 112 described above. The dome 206 may be surrounded, or fenced in, at the sides thereof by the framed dome cage 208. For example, in some instances, the dome cage 208 may have a rectangular shape, or circular shape, or other shape having a plurality of sides that are connected to form a closed shape so that the dome 206 is surrounded or enclosed on all lateral sides of the dome 206. The dome cage 208 may be a sturdy material that is structurally firm to provide protection from damage to the dome 206. The dome cage 208 may be formed as a shaped frame resting on short leg posts (see FIG. 3) and is open at the top side thereof to allow a force to be applied to the top of the dome 206. Alternatively, sides of the dome cage 208 may be consistent in height at a side and all the way around the dome 206, so as to be like a solid wall. However, the dome cover sheet 210 may be placed over the open top of the dome cage 208 so as to cover the dome 206, and thereby prevent direct contact between the dome 206 and the key stiffener 212. Additionally, the key stiffener 212 is covered by the cover 214, and the barrier between key 202 and an adjacent key (K) may be supported by a frame 216.

Due to the micro-size of the light sources used in this application, there are many locations where the light sources, such as unpackaged LEDs measuring between 25-50 microns, may be disposed. Additionally, as described in U.S. application Ser. No. 14/939,896, the light sources may be electrically powered and connected via a thin conductive trace disposed on the components of the apparatus. Thus, several layouts are possible. In the following description of the exploded cross-section 300 of key 202 in FIG. 3, the use of the term "light source" (whether or not preceded by "a") may indicate one or more light sources. Furthermore, it is contemplated that any one or a combination of more than one of the following descriptions of light source layouts may be implemented according to a desired strength of backlighting the apparatus. As such, the descriptive statement of a layout where the base 204 of key 202 may have a light source 302 disposed thereon and positioned to be under the dome 206, indicates that the block identified by reference numeral 302 may be a single light source or may represent a plurality of light sources, all of which are contained somewhere within a perimeter defined by an outer periphery of the dome 206. Accordingly, while the light source 302 is depicted in the center of the dome, the light source(s) 302 may actually be off center and distributed beneath the dome where the light source(s) 302 will not interfere with the electrical contact between the dome 206 and electronic circuitry on the base 302 when force is applied to the cover 214.

Additional potential light source layouts may include the following: a light source 304 on the base 204 in between the dome 206 and the dome cage 208; a light source 306 on the base 304 around the outside of the dome cage 208; a light source 308 embedded in the dome cage 208; a light source 310 disposed on the dome cage 308; a light source 312 disposed on the dome cover sheet 210; a light source 314 disposed underneath the key stiffener 212; a light source 316 disposed on the key stiffener 212; and/or a light source 318 disposed directly on an underside of the cover 214. In one instance, a series of light sources may be disposed directly aligned with the shape of the legend on or under the cover 214. It is noted that while the above description of potential light source layouts describes the light sources (302-318) as being "under," "in," "around," "on," "embedded," or "underneath" various components, it is further contemplated by the inventors that the light sources may be disposed in various other manners with respect to each of the individual components. That is, for example, where a light source is described as being "on" a component, the light source may alternatively, or additionally, be "embedded in," "underneath," "in," etc. the component where possible.

In connection with the above descriptions of potential light source layouts, multiple embodiments of phosphor application (for light emission modification) are contemplated. In general, phosphor may be applied to modify the color and dispersion of the light emitted from the light sources. Thus, the phosphor may be applied in or on components, or portions of those components, through which light may shine. In some instances, phosphor may be applied directly on the light source(s) 302-318 and/or on or mixed into the material of the dome cage 208, the dome cover sheet 210, the key stiffener 212, or the cover 214. For example, phosphor may be applied (not shown explicitly) to an upper surface of one or more sides of the dome cage 208, and a light source, such as one or more unpackaged LEDs, may be connected to a thin circuit on the base and aligned directly beneath the one or more sides of the dome cage 208.

Figure 4:
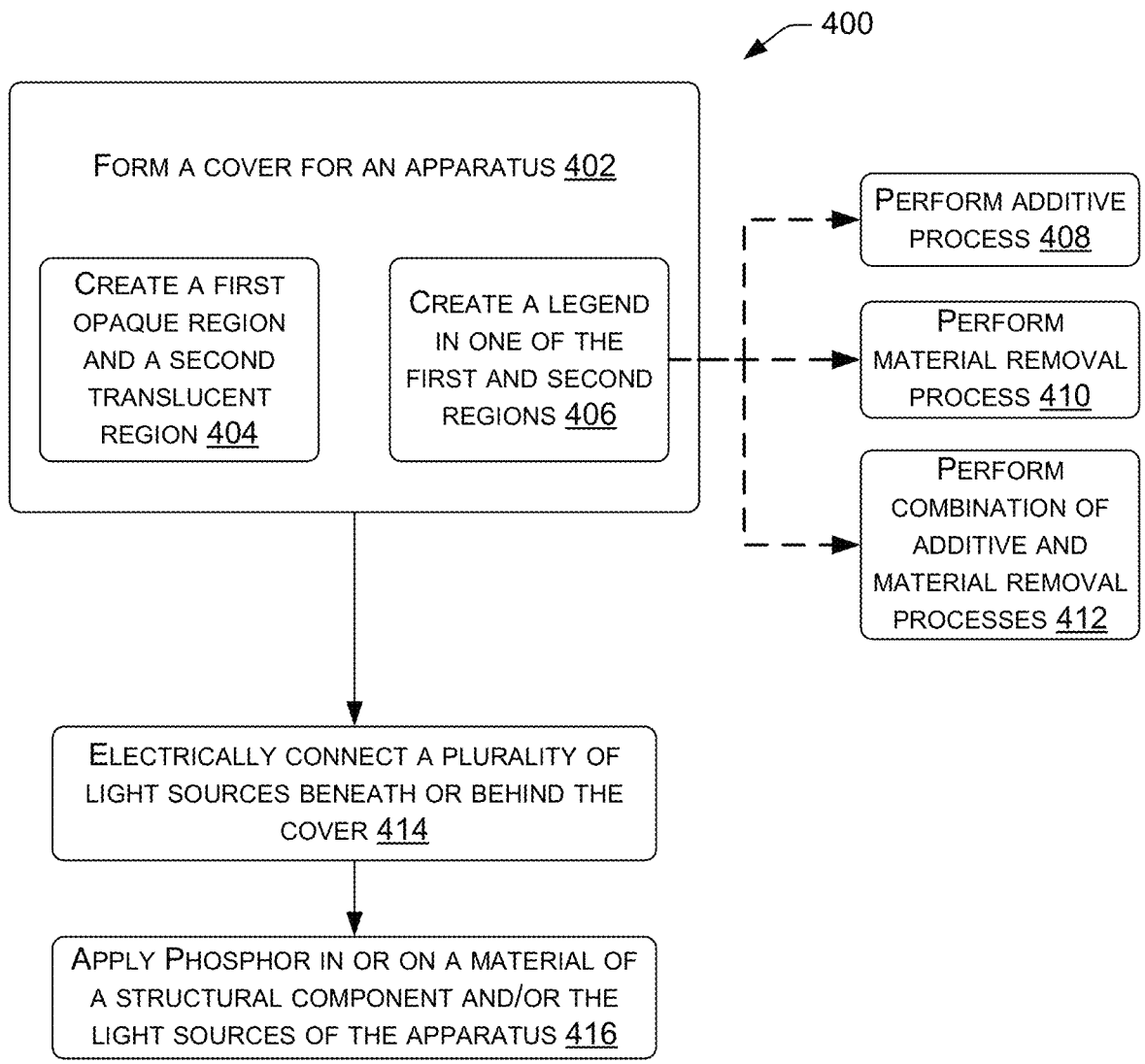
FIG. 4 illustrates a method of manufacturing an apparatus having a backlit cover.

FIG. 4 depicts a method 400 of creating an apparatus, such as key of a keyboard that is to be backlit. In particular, method 400 may include forming a cover 402 for the apparatus. For example, in some instances, step 402 may include forming a fabric key cover for a key of a keyboard device. The formation of the cover may include creating a first opaque region on the cover and a second translucent region on the cover 404. The creation of the first and second regions may be performed in a single act or may involve two or more acts. The formation of the cover may further include creating a legend in one of the first region and the second region of the cover 406. Note that the possibility remains that the legend may be formed partly in the first region and partly in the second region. Additionally, the legend may be formed via many methods as discussed above. In some instances, the legend may be formed via an additive process 408 such as dye sublimation, via a material removal process

410 using a laser or any suitable cutting or etching device, or via a combination of an additive process and a material removal process 412.

In step 414, a plurality of light sources may be electrically connected beneath or behind the cover of the apparatus. For example, in a keyboard device, the plurality of light sources may be electrically connected beneath the fabric key cover to illuminate the translucent region of the keys from underneath the covers. In other apparatuses, the light sources also illuminate the translucent region of the covers.

Method 400 may further include a step 416 of applying a phosphor in or on a material of a structural component and/or the light sources of the apparatus. The application of phosphor may be executed in any order with respect to the other steps of method 400, including prior to integrating the light sources into the apparatus. In some instances, one or more of the components of the key(s) in FIGS. 2 and 3 may include phosphor in the material composition or on the component(s) (i.e., deposited on a surface of the component(s) via spraying, printing, coating, dipping, thermal forming, etc.).

Example Clauses

A: A keyboard apparatus comprising: a fabric key cover having a plurality of holes that extend through a thickness of the cover from a top side of the cover to a bottom side of the cover, the plurality of holes being arranged to collectively form a predetermined shape; a mask layer disposed at the bottom side of the cover, a first region of the mask layer being opaque and a second region of the mask layer allowing light to pass therethrough to the plurality of holes; a light source disposed beneath the mask layer and positioned such that light emitted from the light source passes through the second region of the mask layer to the plurality of holes; and a sensory contact terminal disposed beneath the mask layer, the terminal detecting a keystroke movement.

B: The apparatus according to paragraph A, wherein the plurality of holes are formed within a perimeter of the predetermined shape of one of a character, number, symbol, image, or graphic.

C: The apparatus according to any of paragraphs A-B, wherein the second region of the mask layer is an aperture within the mask layer.

D: The apparatus according to any of paragraphs A-C, wherein the aperture in the second region of the mask layer has a peripheral shape that is aligned with and shaped substantially similar to a perimeter of the predetermined shape within which the plurality of holes are formed.

E: The apparatus according to any of paragraphs A-D, wherein the first region of the mask layer is sized and shaped to block light from passing outside of a perimeter of the predetermined shape within which the plurality of holes in the cover are formed.

F: The apparatus according to any of paragraphs A-E, wherein the second region of the mask layer is a translucent material.

G: The apparatus according to any of paragraphs A-F, wherein the second region of the mask layer includes a material containing phosphor.

H: The apparatus according to any of paragraphs A-G, further comprising a keycap stiffener disposed between the mask layer and the light source.

I: The apparatus according to any of paragraphs A-H, wherein the keycap stiffener is translucent.

J: The apparatus according to any of paragraphs A-I, wherein the keycap stiffener includes phosphor.

K: The apparatus according to any of paragraphs A-J, wherein a material of the keycap stiffener diffuses the light from the light source.

L: The apparatus according to any of paragraphs A-K, wherein an internal surface of the plurality of holes in the fabric key cover are fused by a laser that forms the plurality of holes.

M: The apparatus according to any of paragraphs A-L, wherein a diameter of each of the plurality of holes ranges from 0.1 to 0.2 mm.

N: The apparatus according to any of paragraphs A-M, wherein the light source includes LEDs arranged adjacent to the sensory contact terminal.

O: The apparatus according to any of paragraphs A-N, wherein the light source includes direct-transferred LEDs disposed adjacent a base of the sensory contact terminal.

P: The apparatus according to any of paragraphs A-O, wherein the sensory contact terminal includes a reflexive dome that responds reflexively upon the keystroke movement.

Q: The apparatus according to any of paragraphs A-P, wherein the light source includes LEDs having a height ranging from 12.5 microns to 200 microns.

R: The apparatus according to any of paragraphs A-Q, wherein the fabric key cover includes a plastic material.

S: The apparatus according to any of paragraphs A-R, wherein the mask layer is printed onto the back of the cover.

T: The apparatus according to any of paragraphs A-S, wherein the mask layer is etched onto the back of the cover.

U: The apparatus according to any of paragraphs A-T, wherein the mask layer includes a colored substrate.

V: The apparatus according to any of paragraphs A-U, further comprising a transparent film or substrate that covers at least a portion of the top side of the cover.

W: The apparatus according to any of paragraphs A-V, wherein the portion of the top side covered by the transparent film or substrate includes an area within a perimeter of the predetermined shape within which the plurality of holes are formed.

X: An apparatus comprising: a cover having a legend formed in a predetermined shape and being visible from a top side of the cover, a first region of the cover being opaque and a second region of the cover being translucent to be illuminated, the legend being located in one of the first and second regions; a light source disposed beneath the cover and positioned such that light emitted from the light source passes through the second region of the cover to show the legend; and a sensory contact terminal disposed beneath the cover, the light source being disposed within an inner perimeter of a footprint of the terminal.

Y: The apparatus according to paragraph X, wherein the cover includes a fibrous fabric.

Z: The apparatus according to any of paragraphs X-Y, wherein the legend is printed into fibers of the fabric via dye sublimation printing.

AA: A method comprising: forming a fabric key cover for a key of a keyboard device, the forming including creating a first opaque region on the cover and a second translucent region on the cover, and creating a legend in one of the first region and the second region of the key cover; electrically connecting a plurality of light sources beneath the fabric key cover.

AB: The method according to paragraph AA, further comprising applying a phosphor in or on a material of a structural component of the key.

AC: The method according to any of paragraphs AA-AB, wherein the creating the legend includes printing the legend via dye sublimation.

AD: The method according to any of paragraphs AA-AC, wherein the creating the legend includes removing material from the key cover.

AE: The method according to any of paragraphs AA-AD, wherein the removing material from the key cover includes applying a laser to the key cover to etch or cut through the key cover.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A method comprising:
   forming a key cover for a key of a keyboard device, the forming of the key cover including:
   defining a plurality of holes that extend through a thickness of the key cover, the plurality of holes being arranged to collectively form a predetermined shape;
   forming a mask layer on a bottom side of the key cover, the forming of the mask layer including:
   creating a first region on the mask layer; and
   creating a second region on the mask layer, the second region including an aperture defined within the mask layer,
   wherein the aperture is shaped in the predetermined shape, and
   wherein the aperture defined by the second region of the mask layer has a peripheral shape that is aligned with and shaped to a perimeter of the predetermined shape within which the plurality of holes are formed.

2. The method of claim 1, further comprising electrically connecting a plurality of light sources beneath the mask layer.

3. The method of claim 2, further comprising including a keycap stiffener between the mask layer and the light sources.

4. The method of claim 3, wherein the keycap stiffener is translucent.

5. The method of claim 3, wherein the keycap stiffener includes phosphor.

6. The method of claim 3, wherein a material of the keycap stiffener diffuses light from the light sources.

7. The method of claim 2, wherein the light sources include direct-transferred light-emitting diodes (LEDs).

8. The method of claim 2, wherein the light sources include LEDs disposed adjacent a base of a sensory contact terminal, the sensory contact terminal detecting a keystroke movement.

9. The method of claim 8, wherein the sensory contact terminal includes a reflexive dome that responds reflexively upon the keystroke movement.

10. The method of claim 2, wherein the light sources include LEDs having a height ranging from 12.5 microns to 200 microns.

11. The method of claim 1, further comprising mechanically coupling a sensory contact terminal beneath the mask layer, the sensory contact terminal detecting a keystroke movement.

12. The method of claim 1, wherein the plurality of holes are formed within the perimeter of the predetermined shape of one of a character, number, symbol, image, or graphic.

13. The method of claim 1, wherein the first region of the mask layer is sized and shaped to block light from passing outside of the perimeter of the predetermined shape within which the plurality of holes in the key cover are formed.

14. The method of claim 1, wherein the second region of the mask layer includes a translucent material.

15. The method of claim 1, wherein the second region of the mask layer includes a material containing phosphor.

16. The method of claim 1, wherein defining the plurality of holes includes fusing, with a laser, an internal surface of the key cover to form the plurality of holes.

17. The method of claim 1, wherein a diameter of the plurality of holes ranges from 0.1 to 0.2 mm.

18. The method of claim 1, wherein the key cover includes a plastic material.

19. The method of claim 1, wherein the mask layer is printed onto a back of the key cover.

20. The method of claim 1, wherein the mask layer is etched onto a back of the key cover.

* * * * *